(12) United States Patent  
McKinley et al.

(10) Patent No.: US 7,891,445 B1
(45) Date of Patent: Feb. 22, 2011

(54) BALL-DRIVE PROPULSION DEVICE

(75) Inventors: Patrick A. McKinley, Corvallis, OR (US); Gregory F. Carlson, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 290 days.

(21) Appl. No.: 12/034,531

(22) Filed: Feb. 20, 2008

Related U.S. Application Data

(60) Provisional application No. 60/891,109, filed on Feb. 22, 2007.

(51) Int. Cl.
*B62D 61/00* (2006.01)

(52) U.S. Cl. .................. 180/7.1; 180/6.2; 180/252

(58) Field of Classification Search .................. 180/7.1, 180/6.2, 252
See application file for complete search history.

(56) References Cited

U.S. PATENT DOCUMENTS

| | | | |
|---|---|---|---|
| 6,340,065 B1 * | 1/2002 | Harris | 180/7.2 |
| 6,802,381 B1 * | 10/2004 | Koors et al. | 180/7.1 |
| 7,130,729 B2 * | 10/2006 | Shin et al. | 701/42 |
| 2006/0243497 A1 * | 11/2006 | Orenbuch | 180/6.2 |
| 2008/0197694 A1 * | 8/2008 | Blevio | 301/6.1 |

FOREIGN PATENT DOCUMENTS

| | | | |
|---|---|---|---|
| JP | 62203824 A | * | 9/1987 |
| JP | 2001354156 A | * | 12/2001 |
| JP | 2003094904 A | * | 4/2003 |
| JP | 2004024329 A | * | 1/2004 |
| WO | WO 9831583 A1 | * | 7/1998 |

* cited by examiner

*Primary Examiner*—Lesley Morris
*Assistant Examiner*—Michael R Stabley

(57) ABSTRACT

Embodiments of the present invention provide an omnidirectional ball-drive propulsion module. The propulsion module may have a drive component supported by a drive frame to engage a ball and a steering component to rotate the drive frame within a housing. Other embodiments may be described and claimed.

20 Claims, 6 Drawing Sheets

BALL-DRIVE PROPULSION DEVICE

CROSS-REFERENCE TO RELATED APPLICATIONS

The present application claims priority to U.S. Provisional Patent Application No. 60/891,109, filed Feb. 22, 2007. The specification of said provisional application is hereby incorporated by reference in its entirety except for those sections, if any, that are inconsistent with this specification.

TECHNICAL FIELD

Embodiments of the present invention relate to the field of ball-drive propulsion devices.

BACKGROUND

Omnidirectional ball-drives that are used in propulsion devices rely upon two drive motors that rotate two corresponding drive gears to transfer energy into ball motion. The drive gears contact the ball on two orthogonally adjacent sides. The drive gears are either rotated forward or backward to accomplish omnidirectional motion. Being located on the side of the ball, each drive gear requires an opposing friction-free roller in a line parallel to the surface being traversed.

SUMMARY

In some embodiments a propulsion module is described having a housing; a ball; a drive component; a drive frame configured to support the drive component in a manner to engage the ball such that a rotation of the drive component causes a corresponding rotation of the ball with respect to the drive frame; and a steering component operationally coupled to the housing and the drive frame in a manner such that a rotation of the steering component causes a corresponding rotation of the housing with respect to the drive frame.

The drive frame may also support the steering component in a manner to engage the housing.

The drive component may include a drive wheel and the steering component may include a steering gear. The steering gear may engage the housing through a ring gear affixed to an interior surface of the housing.

The steering component may be a first steering component and the propulsion module may further comprise a second steering component supported by the drive frame in a manner to engage the housing, the first steering component and the second steering component disposed on opposite sides of the ball.

The drive frame may include a central portion to support the drive component and a cantilevered arm portion to support the steering component.

In some embodiments the propulsion module may include a first motor configured to rotate the drive component; and a second motor configured to rotate the steering component.

Power strips may be disposed on a surface of the drive frame; and electrical contacts may be disposed on a surface of the housing to electrically couple to the power strips.

The propulsion module may include a drive bearing shaft coupling the housing to the drive frame in a manner that allows the drive frame to rotate with respect to the housing.

In some embodiments, a system is described that includes a propulsion module with a housing, a ball, a drive component, a drive frame configured to support the drive component in a manner to engage the ball such that a rotation of the drive component causes a corresponding rotation of the ball with respect to the drive frame, and a steering component operationally coupled to the housing and the drive frame in a manner such that a rotation of the steering component causes a corresponding rotation of the housing with respect to the drive frame; and a control module configured to control rotation of the drive component and the steering component.

The control module may be further configured to control rotation of the drive component and the steering component based at least in part on a programmed task.

The system may include a user interface; and the control module may control the rotation of the drive component and the steering component based at least in part on control signals provided through the user interface.

The system may include an environmental module having one or more sensors to provide control feedback; and the control module may control the rotation of the drive component and the steering component based at least in part on the control feedback.

The drive frame may also support the steering component in a manner to engage the housing.

The drive component may include a drive wheel and the steering component may include a steering gear that engages the housing through a ring gear affixed to an interior surface of the housing.

The steering component may be a first steering component and the system further comprises a second steering component supported by the drive frame in a manner to engage the housing, the first steering component and the second steering component disposed on opposite sides of the ball.

The drive frame may include a central portion to support the drive component and a cantilevered arm portion to support the steering component.

The system may include power strips disposed on a surface of the drive frame; and electrical contacts disposed on a surface of the housing to electrically couple to the power strips.

The system may include a drive bearing shaft coupling the housing to the drive frame in a manner that allows the drive frame to rotate with respect to the housing.

A method for operating an omnidirectional ball-drive propulsion module is also described in accordance with various embodiments. The method may include providing a drive control signal to rotate a drive component engaged with a ball to cause a corresponding rotation of the ball with respect to a drive frame supporting the drive component; and providing a steering control signal to rotate the drive frame with respect to a housing of a propulsion module.

The steering control signal may be provided to a steering motor to rotate the drive frame by rotating a steering component operationally coupled to the housing and the drive frame.

The providing of the drive control signal and the steering control signal may be based at least in part on a preprogrammed task and/or control signals received from a user interface.

Other features that are considered as characteristic for embodiments of the present invention are set forth in the appended claims.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrases "A/B" and "A and/or B" mean (A), (B), or (A and B). For the purposes of the present invention, the phrase "A, B, and/or C" means (A), (B), (C), (A and B), (A and C), (B and C), or (A, B, and C). For the purposes of the present invention, the phrase "(A)B" means (B) or (A and B), that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
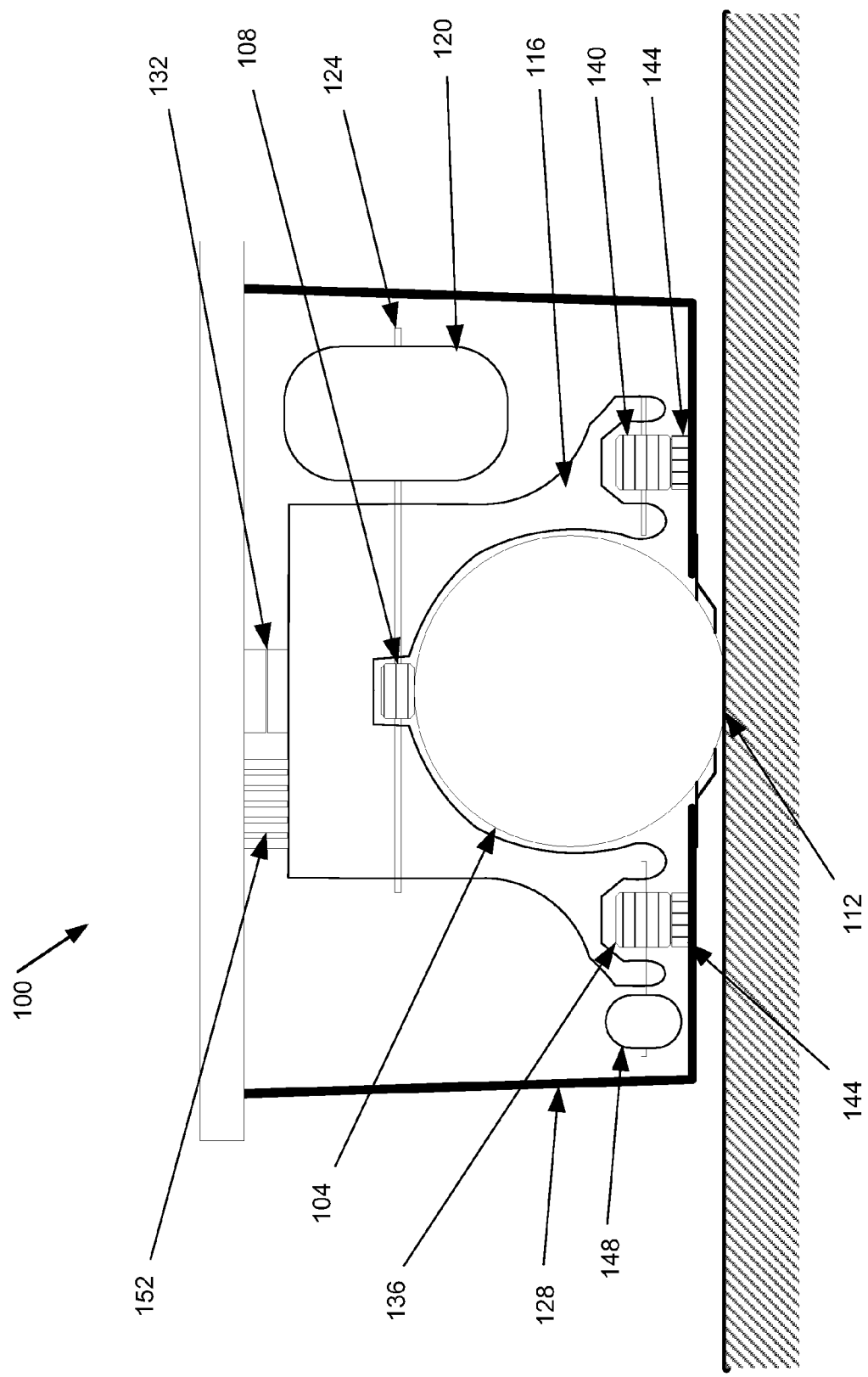
FIG. 1 is a side cross-section view of a ball-drive propulsion module in accordance with various embodiments of the present invention.
Figure 2:
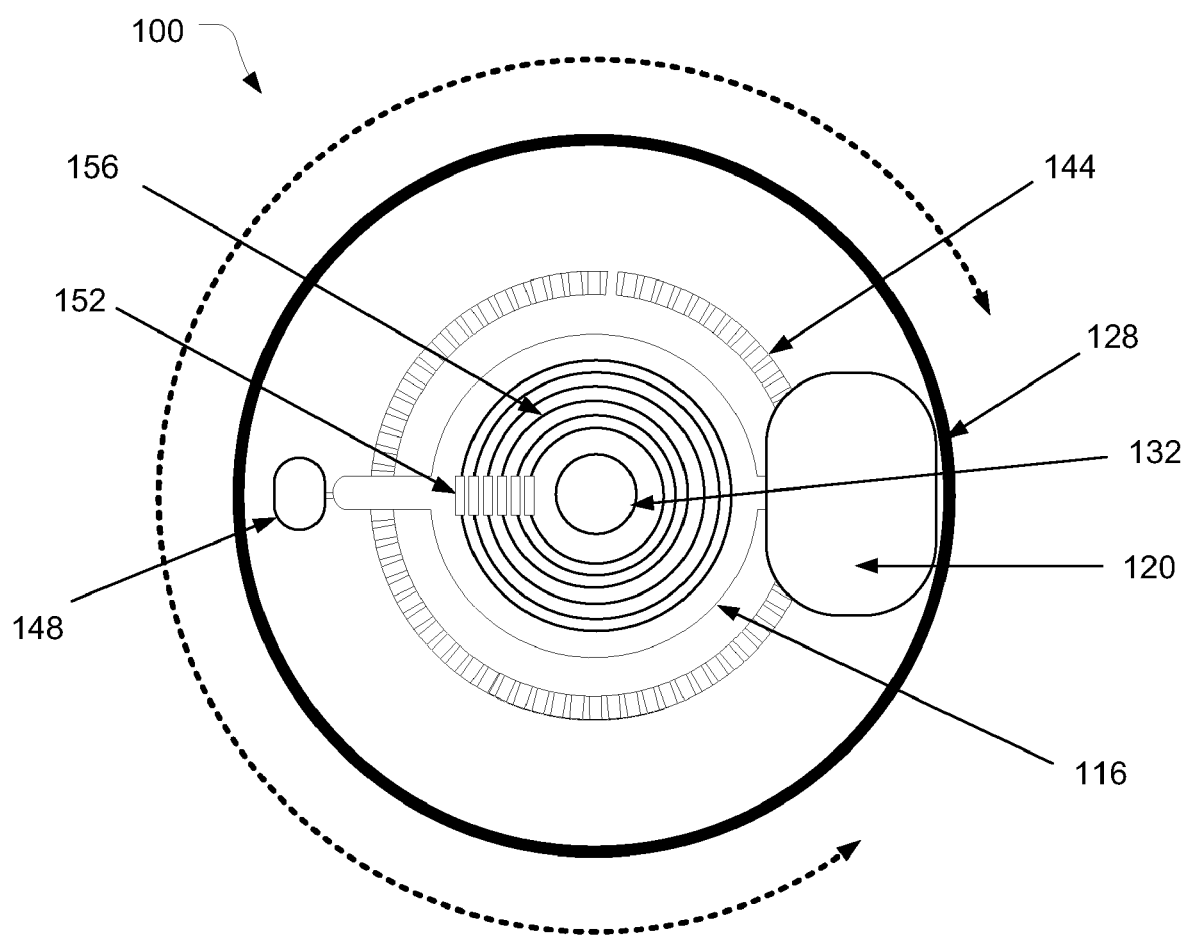
FIG. 2 is a top cross-section view of a ball-drive propulsion module in accordance with various embodiments of the present invention.

FIGS. 1 and 2 are a side cross-section view and a top cross-section view, respectively, of a ball-drive propulsion module (hereinafter "propulsion module") 100 in accordance with various embodiments of the present invention. The propulsion module 100 may include a ball 104 driven by a drive component, e.g., a drive wheel 108, in order to propel the propulsion module 100 across an adjacent traversal surface 112. The ball 104 may extend from a bottom surface of the propulsion module 100 to contact the surface 112. The ball 104 may be a rubber, rubberlike, or rubberized ball designed to provide sufficient traction with the surface 112. Sufficient traction may be facilitated through a contact force between the propulsion module 100 and the surface 112. The contact force may include a gravitational component provided by the weight of the propulsion module 100.

The propulsion module 100 may include a drive frame 116 that is configured to support the drive wheel 108 in a manner to engage the ball 104 such that a rotation of the drive wheel 108 causes a corresponding rotation of the ball 104 with respect to the drive frame 116. The drive wheel 108 and the ball 104 may each be made of a material that results in a sufficient traction that allows this corresponding rotation to occur. The traction may be facilitated through the weight of the propulsion module 100 and other supported structure providing a gravitational contact force between the drive wheel 108 and the ball 104. A motor 120 may be operationally coupled to the drive wheel 108 through a shaft assembly 124 to rotate the drive wheel 108 forward or backward, which will result in the propulsion module 100 being propelled forward or backward over the surface 112.

The drive frame 116 may be coupled to a housing 128 of the propulsion module 100 through a bearing shaft 132. The bearing shaft 132 may allow the drive frame 116 to rotate with respect to the housing 128.

The drive frame 116, in addition to supporting the drive wheel 108, may also support one or more steering components, e.g., steering gear 136 and steering gear 140. The steering gears 136 and 140 may be supported in a manner to engage the housing 128 such that a rotation of one or more of the steering gears causes a corresponding rotation of the drive frame 116 relative to the housing 128. The steering gears 136 and 140 may engage the housing 128 via a ring gear 144 affixed to an interior surface of the housing 128.

In this embodiment, steering gear 136 may be driven by a motor 148. The steering gear 140 may provide support and alignment functions and may not be directly driven by a motor. In other embodiments, steering gear 140 may also be driven by a motor similar to motor 148.

Driving the steering gear 136 forward or backward will result in the drive frame 116, and therefore the axis of the drive wheel 108, spinning around the vertical axis of the bearing shaft 132 and providing a new drive direction for the propulsion module 100. The forward and backward motion may then be provided by the drive wheel 108 as discussed above. In this manner, the propulsion module 100 may provide omnidirectional (e.g., 360 degree) motion using only one rotating component, e.g., the drive wheel 108, that contacts the ball 104.

Utilizing one contact component, as opposed to the multiple contact components of prior art, may reduce the wear of the various elements, e.g., the surface of the ball 104, and could reduce the power consumption and cost of having multiple drive motors. Furthermore, utilizing geared steering assemblies, as shown, may also increase the reliability and/or accuracy of the device, as a geared steering assembly may be less prone to slippage than a steering assembly that relies upon contact with the ball 104 itself.

Electrical contacts 152 may be physically coupled to the housing 128 and electrically coupled to power rings 156 disposed on a top surface of the drive frame 116 to provide power to various drive and steering motors, e.g., motor 120 and motor 148.

As discussed above, the contact force between the propulsion module 100 and the surface 112 may be provided by a gravitational component. However, some embodiments may supplant and/or augment the gravitational component with other attractive forces. For example, a contact force may be provided, at least in part, by providing a low-pressure field. This may be done using a vacuum-type arrangement. In another example, a contact force may be provided, at least in part, by an attractive intermolecular force, which may also be referred to as van der Waals force. A sufficient attractive intermolecular force may be provided by covering the contact surface of the ball 104 (or other component of the propulsion module 100 or system within which the propulsion module 100 is integrated) with synthetic setae that provide a large area of contact, thereby increasing the attractive intermolecular force. The synthetic setae may be constructed of an elastomer. In yet another example, the contact force may include a magnetic component, with the ball and the adjacent surface (or substrate of the surface) constructed of materials having complementary magnetic properties. Embodiments having the gravitational component of the contact force supplanted and/or augmented by other force components may allow the propulsion module 100 to traverse sloped surfaces, vertical surfaces, or even travel upside-down.

The contact force may be provided by one or more contact force components, which may be a part of, or separate from, the propulsion module 100.

Figure 3:
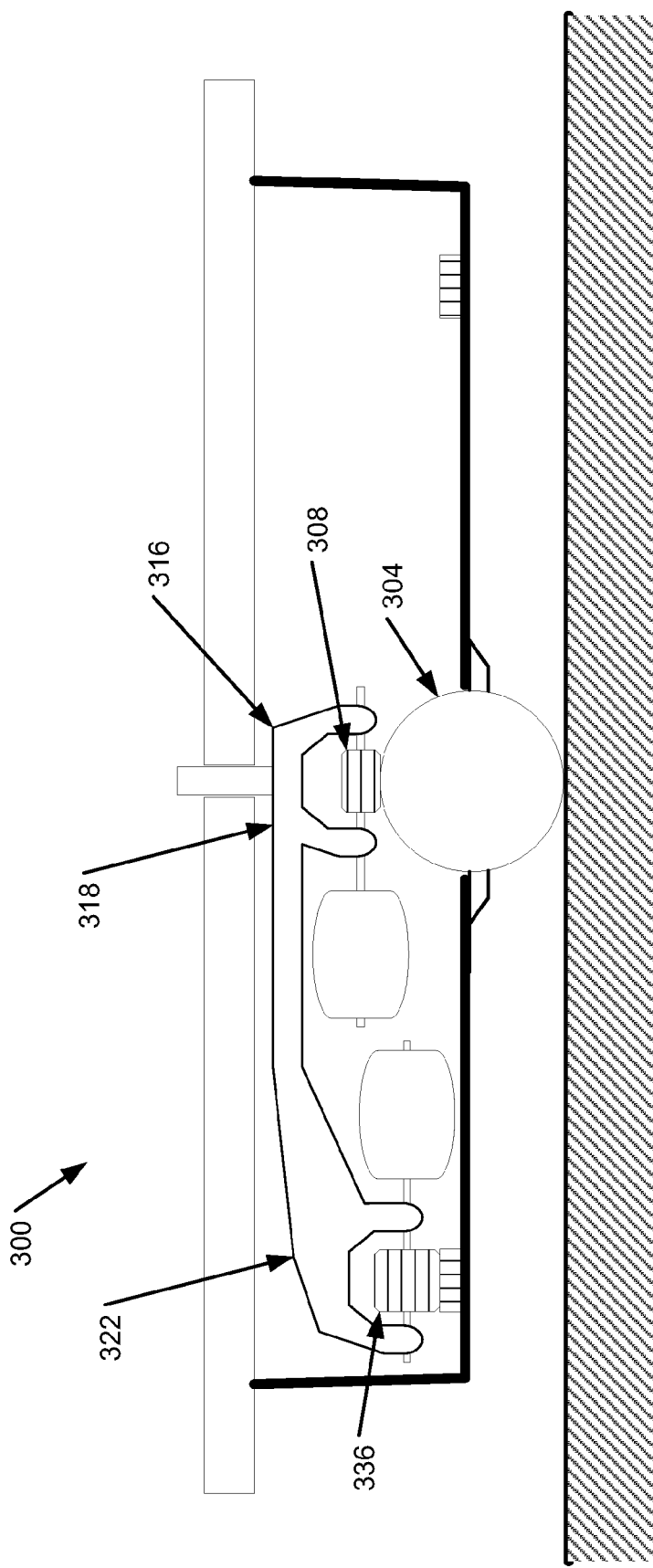
FIG. 3 is a side cross-section view of a ball-drive propulsion module in accordance with various embodiments of the present invention.
Figure 4:
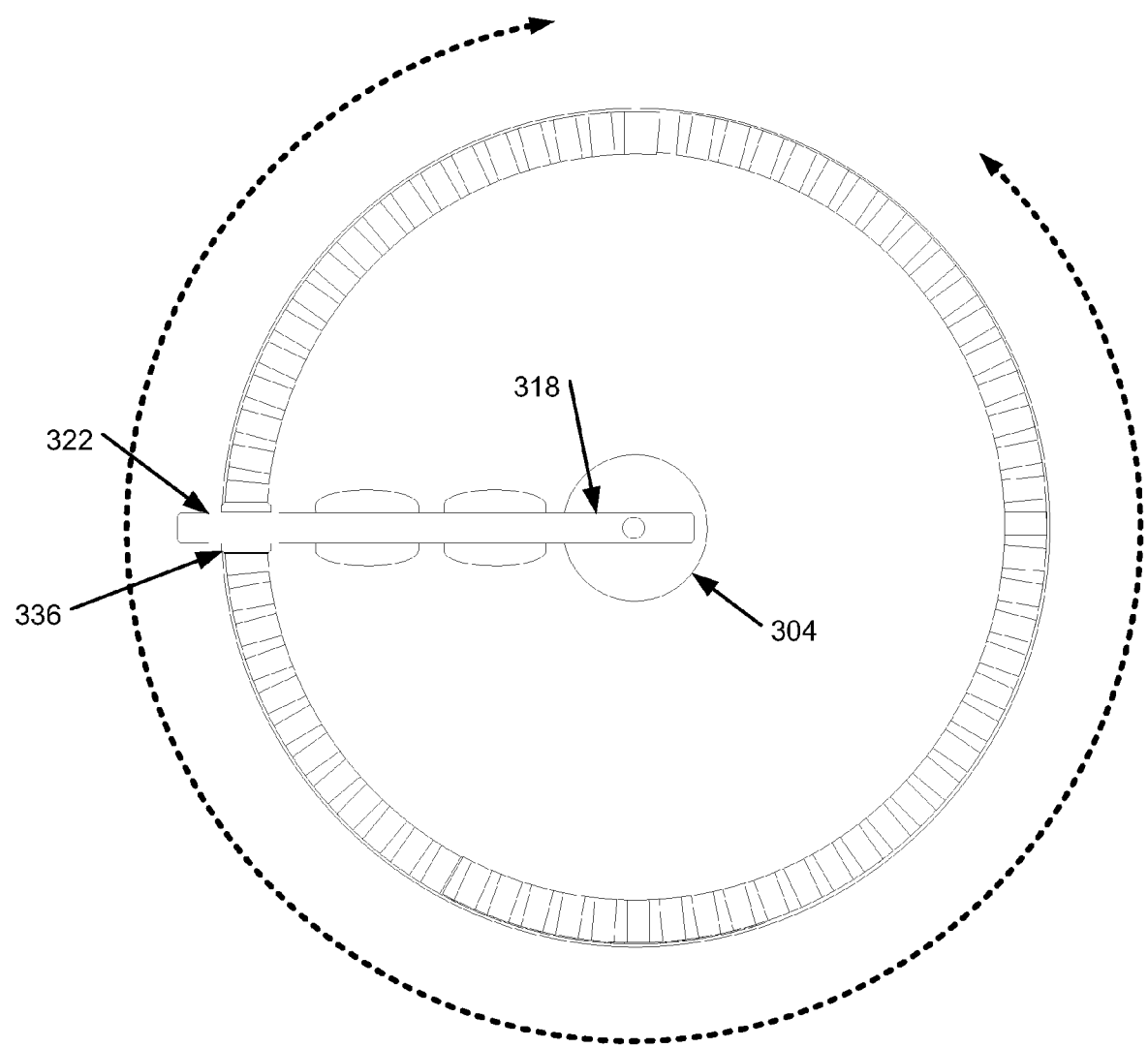
FIG. 4 is a top cross-section view of a ball-drive propulsion module in accordance with various embodiments of the present invention.

FIGS. 3 and 4 are a side cross-section view and a top cross-section view, respectively, of a propulsion module 300 in accordance with various embodiments of the present invention. The propulsion module 300 may be a low-profile embodiment provided through the employment of a cantilevered drive frame 316. The drive frame 316 may include a central portion 318 to support a drive wheel 308 and a cantilevered arm portion 322 to support a steering gear 336. While this embodiment only shows one steering gear supported by the drive frame 316, other embodiments may have another steering gear supported by another cantilevered arm portion. The second steering gear may be disposed on an opposite side of a ball 304.

Except as otherwise described, the propulsion module 300 may have elements similar to the elements described with respect to other propulsion modules.

Figure 5:
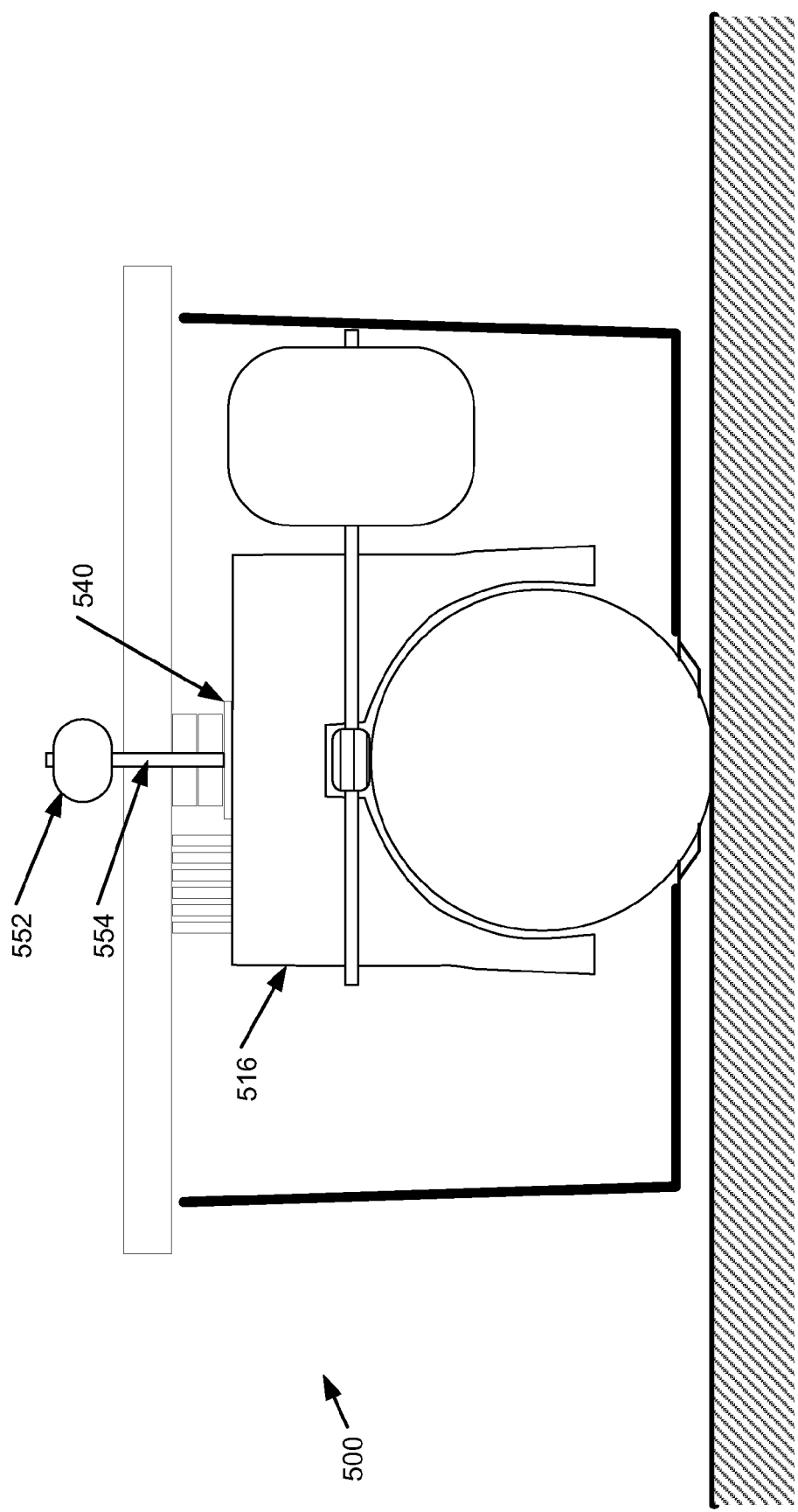
FIG. 5 is a side cross-section view of a ball-drive propulsion module in accordance with various embodiments of the present invention.

FIG. 5 is a side cross-section view of another propulsion module 500 in accordance with various embodiments of the present invention. The propulsion module 500 may include a steering motor 552 operatively coupled to a steering component 540 through a drive shaft 554. The steering component 540 may be attached to a drive frame 516. Therefore, contrary to the earlier described embodiments, the steering motor 552 may apply a rotational force directly to the drive frame 516.

Except as otherwise described, the propulsion module 500 may have elements similar to the elements described with respect to other propulsion modules.

Figure 6:
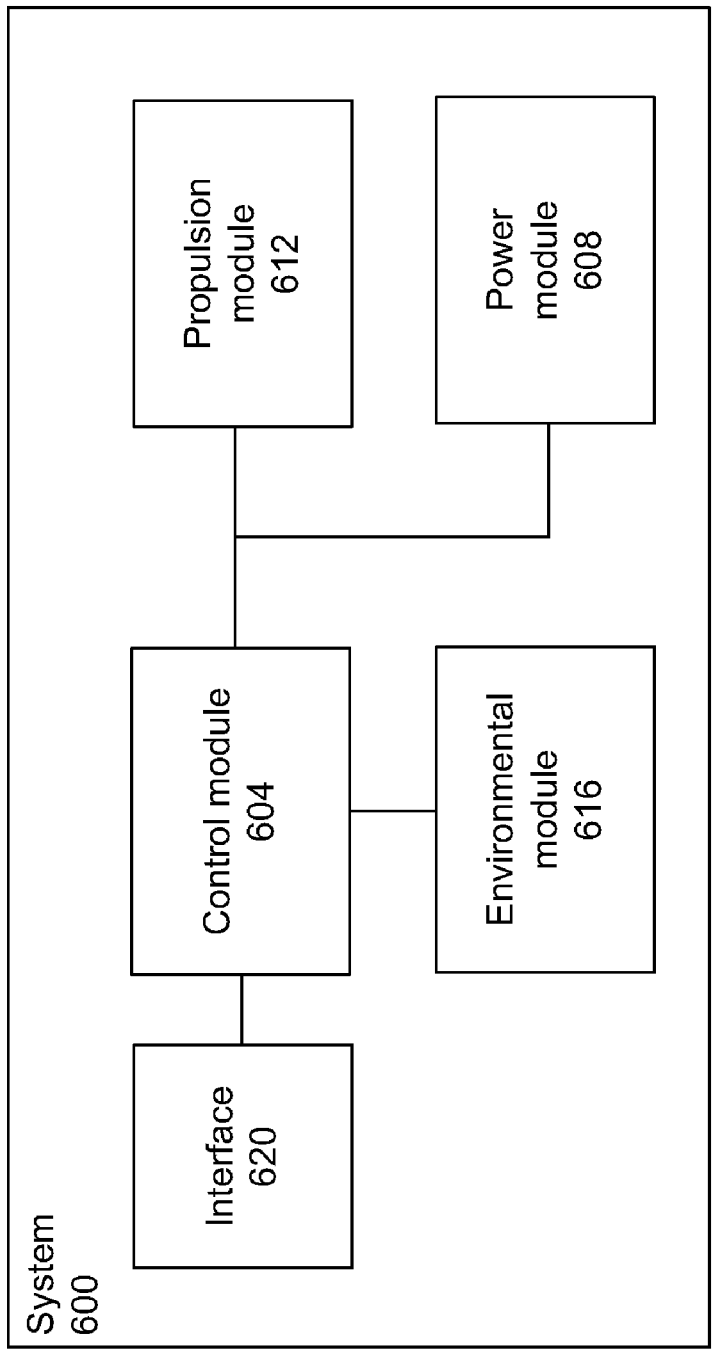
FIG. 6 is a schematic of a system having one or more propulsion modules in accordance with various embodiments of the present invention.

FIG. 6 is a schematic of a system 600 in accordance with one or more embodiments of the present invention. The system 600 may include a control module 604, a power module 608, and propulsion module 612 operatively coupled to each other as shown. The propulsion module 612 may include one or more of propulsion module 100, propulsion module 300, and/or propulsion module 500. The control module 604 may control the speed and/or direction of the system 600 by cooperatively controlling the drive and/or steering motors of the propulsion module 612.

In some embodiments, the control module 604 may autonomously control the speed and/or direction based at least in part on a programmed task. For example, the system 600 may be a self-propelled image translation device. The control module 604 may then control the speed and/or direction of the system 600 in order to complete an image translation operation, e.g., a printing operation and/or a scanning operation.

In another example, the system 600 may be a mobile vacuum cleaner programmed to traverse a floor in a set, or a randomized, pattern.

In some embodiments, the control module 604 may include an environmental module 616 having one or more sensors configured to provide the control module 604 with control feedback regarding an external environment and/or motion of the system 600. The control module 604 may then provide appropriate adjustments to the speed and/or direction based at least further in part on this control feedback. The sensors of the environmental module 616 may include, e.g., proximity sensors, navigational sensors, speed sensors, etc.

In some embodiments, the control module 604 may control the speed and/or direction based at least in part on externally supplied controls, e.g., user input, received through an interface 620. The interface 620 may be a user interface so that these controls may be supplied locally and/or a communication interface so that these controls may be supplied remotely. For example, the system 600 may be a personal transport vehicle, an automobile, a lawn mower, etc.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
 a ball;
 a drive component;
 a drive frame configured to support the drive component in a manner to engage the ball such that a rotation of the drive component causes a corresponding rotation of the ball with respect to the drive frame;
 a steering component operationally coupled to a housing and the drive frame in a manner such that a rotation of the steering component causes a corresponding rotation of the housing with respect to the drive frame;
 power strips disposed on a surface of the drive frame; and
 electrical contacts disposed on a surface of the housing, the electrical contacts configured to electrically couple to the power strips.

2. The apparatus of claim 1, wherein the drive frame is further configured to support the steering component in a manner to engage the housing.

3. The apparatus of claim 2, wherein:
 the drive component includes a drive wheel; and
 the steering component includes a steering gear.

4. The apparatus of claim 3, further comprising:
 a ring gear affixed to an interior surface of the housing, wherein the steering gear is configured to engage the housing via the ring gear.

5. The apparatus of claim 2, wherein the steering component is a first steering component and the apparatus further comprises:
 a second steering component supported by the drive frame in a manner to engage the housing, the first steering component and the second steering component disposed on opposite sides of the ball.

6. The apparatus of claim 1, wherein the drive frame includes (i) a central portion to support the drive component and (ii) a cantilevered arm portion to support the steering component.

7. The apparatus of claim 1, further comprising:
a first motor configured to rotate the drive component; and
a second motor configured to rotate the steering component.

8. The apparatus of claim 1, further comprising:
a drive bearing shaft coupling the housing to the drive frame in a manner that allows the drive frame to rotate with respect to the housing.

9. A system comprising:
a propulsion module including
a ball,
a drive component,
a drive frame configured to support the drive component in a manner to engage the ball such that a rotation of the drive component causes a corresponding rotation of the ball with respect to the drive frame, and
a steering component operationally coupled to a housing and the drive frame in a manner such that a rotation of the steering component causes a corresponding rotation of the housing with respect to the drive frame;
a control module configured to control a rotation of each of (i) the drive component and (ii) the steering component;
power strips disposed on a surface of the drive frame; and
electrical contacts disposed on a surface of the housing, the electrical contacts configured to electrically couple to the power strips.

10. The system of claim 9, wherein the control module is further configured to control the rotation of each of (i) the drive component and (ii) the steering component based at least in part on a programmed task.

11. The system of claim 9, further comprising:
a user interface,
wherein the control module is further configured to control the rotation of each of (i) the drive component and (ii) the steering component based at least in part on control signals received from the user interface.

12. The system of claim 9, further comprising:
an environmental module having one or more sensors to provide control feedback,
wherein the control module is configured to control the rotation of each of (i) the drive component and (ii) the steering component based at least in part on the control feedback.

13. The system of claim 9, wherein the drive frame is further configured to support the steering component in a manner to engage the housing.

14. The system of claim 9, wherein:
the drive component includes a drive wheel; and
the steering component includes a steering gear.

15. The system of claim 9, further comprising:
a ring gear affixed to an interior surface of the housing, wherein the steering gear is configured to engage the housing via the ring gear.

16. The system of claim 9, wherein the steering component is a first steering component and the system further comprises:
a second steering component supported by the drive frame in a manner to engage the housing, the first steering component and the second steering component disposed on opposite sides of the ball.

17. The system of claim 9, wherein the drive frame includes (i) a central portion to support the drive component and (ii) a cantilevered arm portion to support the steering component.

18. The system of claim 9, further comprising:
a drive bearing shaft coupling the housing to the drive frame in a manner that allows the drive frame to rotate with respect to the housing.

19. An apparatus comprising:
a ball;
a drive component;
a drive frame configured to support the drive component in a manner to engage the ball such that a rotation of the drive component causes a corresponding rotation of the ball with respect to the drive frame;
a first steering component operationally coupled to a housing and the drive frame in a manner such that a rotation of the steering component causes a corresponding rotation of the housing with respect to the drive frame; and
a second steering component supported by the drive frame, the first steering component and the second steering component being disposed on opposite sides of the ball,
wherein the drive frame is further configured to support the first steering component and the second steering component in a manner to engage the housing.

20. A system comprising:
a propulsion module including
a ball,
a drive component,
a drive frame configured to support the drive component in a manner to engage the ball such that a rotation of the drive component causes a corresponding rotation of the ball with respect to the drive frame, and
a first steering component and a second steering component operationally coupled to a housing and the drive frame in a manner such that a rotation of each of (i) the first second steering component and (ii) the second steering component causes a corresponding rotation of the housing with respect to the drive frame; and
a control module configured to control rotation of each of the drive component and the steering component,
wherein the first steering component and the second steering component are supported by the drive frame in a manner to engage the housing, the first steering component and the second steering component being disposed on opposite sides of the ball.

* * * * *